United States Patent [19]
Berndt et al.

[11] 3,892,318
[45] July 1, 1975

[54] DEVICE FOR STACKING BRICKS IN LAYERS

[75] Inventors: Walter Berndt, Laggenbeck, Westfalia, Germany; Helmut F. Lauff, Furlong, Pa.

[73] Assignee: C. Keller & Co., Westfallen, Germany

[22] Filed: Apr. 19, 1974

[21] Appl. No.: 462,514

[30] Foreign Application Priority Data
Oct. 26, 1973 Germany............ 2353752

[52] U.S. Cl............ 214/6 A; 198/34; 214/6 M
[51] Int. Cl............................ B65g 57/24
[58] Field of Search.......... 214/6 A, 6 M, 8.5 C; 198/34

[56] References Cited
UNITED STATES PATENTS

| | | |
|---|---|---|
| 3,601,266 | 8/1971 | Pearne et al. .................. 214/8.5 C |
| 3,608,746 | 9/1971 | Meyer .......................... 214/6 A |
| 3,656,634 | 4/1972 | Pearne et al. .................. 214/6 A |
| 3,656,635 | 4/1972 | Schafer et al. ................. 214/8.5 C |

*Primary Examiner*—Robert J. Spar
*Assistant Examiner*—Leslie J. Paperner
*Attorney, Agent, or Firm*—Mason, Mason & Albright

[57] ABSTRACT

A device for producing a stack of bricks has means for forming, in one layer of the stack, passages for receiving the arms of a fork-lift device. The layers of the stack above this layer are prevented from collapsing into the passages by an intermediate sheet-like supporting layer. The stack is produced on a stacking table which can be lowered stepwise, and the various layers are fed to the stacking table by gripper means.

3 Claims, 4 Drawing Figures

DEVICE FOR STACKING BRICKS IN LAYERS

BACKGROUND OF THE INVENTION

1. Field of the Invention

The present invention relates to a device for stacking bricks in layers.

2. Description of the Prior Art

German Patent Specification No. 1,918,017 relates to a device for stacking bricks in layers which comprises a horizontally and vertically displaceable gripping device for receiving layers of bricks from a transport track provided with an end stop and for depositing same on a stacking table.

This previously proposed device is only suitable for the formation of tightly compact stacks of bricks. In practice, however, there is a requirement for stacks of bricks which are provided with two through passages for receiving the two forks of a fork-lift stacker or the like.

An object of the invention is to provide a device with relatively few component parts which forms a stack having such passages.

SUMMARY OF THE INVENTION

According to the present invention, there is provided a device for forming a stack of bricks comprising a plurality of first layers of bricks, a second layer of bricks in which passages are provided to receive the arms of fork-lifting means, and an intermediate layer arranged between the second layer and the first layers above the second layer, said device comprising first and second conveyor means, first gripper means operative to deposit layers of bricks on the first conveyor means and to deposit layers of bricks on the second conveyor means, stop means for the brick layers, said stop means being arranged at the downsteam end portion of the first conveyor means, a stacking table arranged to be lowered stepwise, second gripper means operative to transfer layers of bricks from the first conveyor means and to deposit same on the stacking table whereby to form the first layers, gap-forming means arranged beyond the downstream end portion of the second conveyor means, said gap-forming means including stop means for the brick layers on the second convey means, said gap-forming means being movable in the direction of movement of the second conveyor means to separate the bricks in order to form said passages in the layer of bricks thereon, whereby said layer of bricks forms said second layer, and third gripper means operative to remove one said intermediate layer from a stack thereof and to deposit same on the said second layer present on the gap-forming means, and to deposit the said second layer with the intermediate layer thereon on the uppermost first layer on the stacking table.

BRIEF DESCRIPTION OF THE DRAWINGS

An embodiment of the invention will now be described, by way of example only, with reference to the accompanying diagrammatic drawings, in which.

DESCRIPTION OF THE PREFERRED EMBODIMENT

Figure 1:
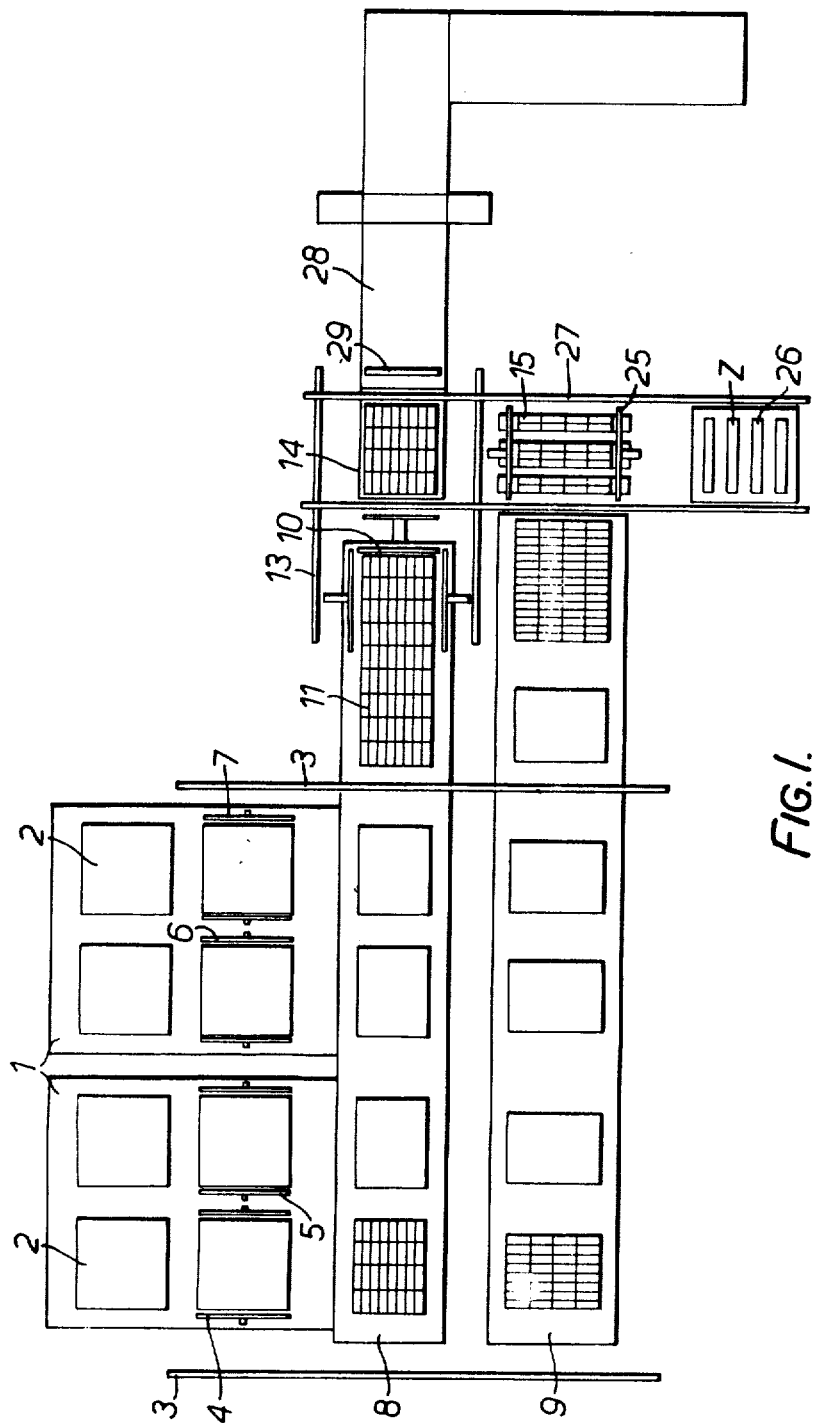
FIG. 1 is a plan view of the device according to the present invention.
Figure 2:
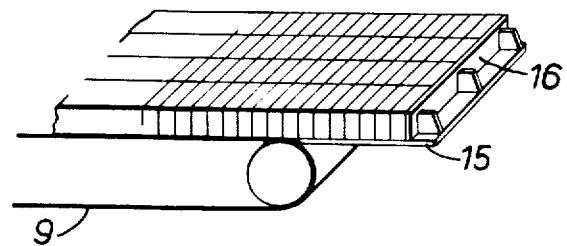
FIGS. 2 and 3 are perspective views of gap-forming means of the device in two operational positions.
Figure 3:
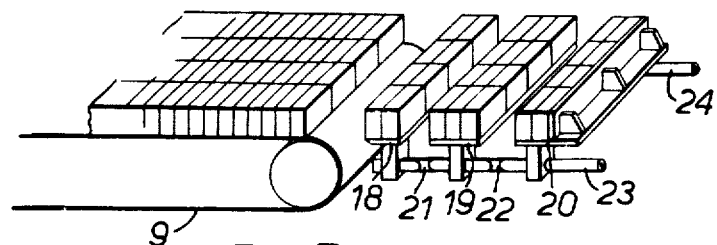
Figure 4:
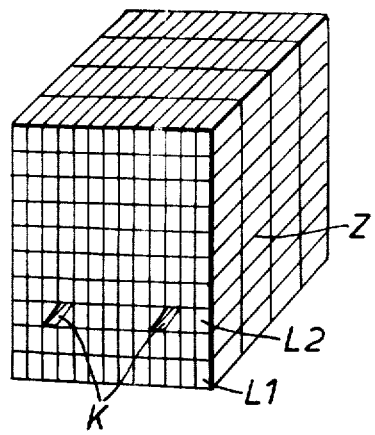
FIG. 4 is a perspective view of the stack of bricks formed by the device.

The device shown in FIGS. 1 to 3 is arranged to form stacks of bricks as shown in FIG. 4. In FIG. 4 the symbol $L_1$ refers to upright layers which consist of upright bricks arranged closely together. These upright layers $L_1$ are therefore compact. $L_2$ refers to a so-called "passage layer" wherein two passage K are provided through the stack to receive the arms of a fork-lift device. In order to prevent these two passages K from being blocked by the bricks lying overhead, the weight of these bricks is carried by an intermediate layer Z. This intermediate layer Z can consist of a plate or foil of veneer, plastics or paper, and is introduced during formation of the stack in such a manner that it is arranged above the layer $L_2$.

In FIG. 1, the reference numeral 1 refers to kiln trolleys which deliver from a kiln, stacks 2 of loosely arranged bricks. The kiln trolleys 1 are pushed underneath a crane runway 3 in such a way that the bricks can be removed in layers by gripper means 4, 5, 6 and 7 which are movable along the crane runway 3.

The gripper means 4 to 7 can be moved horizontally and vertically so that they deposit the individual layers of bricks onto two conveyor belts 8, 9 which project into the travelling zone of the gripper means 4 to 7.

The individual layers of the stack 2 frequently consist of double layers, in which case the gripper means 4 to 7 deposit these double layers on the conveyor belts 8, 9, move upwardly in a vertical direction, grip the upper layers of these double layers and deposit them onto the two conveyor belts 8, 9 after the previously-deposited lower layers have been advanced by the conveyor belts 8, 9.

The layers of bricks are so arranged on the conveyor belt 8 that their longer sides extend parallel to the direction of movement of the conveyor belt 8. When the layers reach the downstream end portion of the conveyor belt 8, they are stopped by a stop 10 whereby successive layers impinge to form a compact, self-contained, comparatively long layer 11.

Gripper means 12 which travels on a crane runway 13 then grips a portion of the layer 11 of appropriate length and deposits same onto a stacking table 14 which can be raised and lowered stepwise by the depth of each layer.

It can be seen from FIG. 4 that one layer $L_2$ is required for every stack of bricks. To form this layer $L_2$, the layers of bricks present on the conveyor belt 9 are so arranged that the longer sides lie transversely to the direction of movement of the conveyor belt 9. When the layers reach the downstream end portion of the conveyor belt 16 they are stopped by a stop 16 of gap forming means 15 (FIG. 2) arranged beyond the conveyor belt 9. The gap forming means 15 takes up the number of bricks required to form one layer $L_2$.

In the illustrated embodiment, the means 15 comprises several plates 18, 19, 20 which are movable, for example, along two guide rods (FIG. 3). When these plates 18 to 20 are to be moved apart or together, folding crossed-arm linkages 21, 22 provided between the plates are actuated by means of cylinders 23, 24, controlled by pressurised fluid. Clearly, the gap-forming means can be of a different construction from that shown.

In order to obtain the layer $L_2$ the gap-forming means 15 is moved somewhat away from the conveyor belt 9 by means which are not shown. At the same time the individual plates 18 to 20 are moved apart by actuating the cylinders 23, 24 so that gaps are formed between the rows of bricks present on the plates 18 to 20.

After gripper means 25 has taken an intermediate layer Z from a stack 26 thereof and has deposited it on the layer $L_2$ produced as described above, this layer $L_2$ is lifted by the gripper means 25 from the gap-forming means 15 and is deposited on the uppermost layer $L_1$ on the stacking table 14. The gripping device 25 travels on an overhead crane runway 27. As mentioned before, the intermediate layer Z consists of a layer of veneer, foil or paper in order to prevent the superposed upright layers $L_1$ from blocking the passages K in the stack.

By the repeated and alternating deposition of the layers $L_1$ and a layer $L_2$ and by lowering the table 14, a stack is formed as shown in FIG. 4. When the stacking operation is terminated, the stack is pushed by means of a pusher or the like onto a conveyor belt 28 and fed by means of a pusher 29 to a processing station, at which, for example, the pack is strapped or is covered with a foil hood.

The device particularly described forms with a minimum of component parts, stacks which are provided with passages for receiving the arms of a fork-lift, means being provided in the stack to prevent collapse of the upper layers of bricks into the passages.

What is claimed is:

1. A device for forming a stack of bricks comprising a plurality of first layers of bricks, a second layer of bricks in which passages are provided to receive the arms of fork-lifting means, and an intermediate layer arranged between the second layer and the first layers above the second layer, said device comprising first and second conveyor means, first gripper means operative to deposit layers of bricks on the first conveyor means and to deposit layers of bricks on the second conveyor means, stop means for the brick layers, said stop means being arranged at the downstream end portion of the first conveyor means, a stacking table arranged to be lowered stepwise, second gripper means operative to transfer layers of bricks from the first conveyor means and to deposit same on the stacking table whereby to form the first layers, gap-forming means arranged beyond the downstream end portion of the second conveyor means, said gap-forming means including stop means for the brick layers on the second conveyor means, said gap-forming means being movable in the direction of movement of the second conveyor means to separate the bricks in order to form said passages in the layer of bricks thereon whereby said layer of bricks forms said second layer, and third gripper means operative to remove one said intermediate layer from a stack thereof and to deposit same on the said second layer present on the gap-forming means, and to deposit the said second layer with the intermediate layer thereon on the uppermost first layer on the stacking table.

2. A device according to claim 1, wherein the gap-forming means comprises a plurality of plates each arranged to receive at least one row of bricks, said plates being relatively movable in a horizontal direction.

3. A device according to claim 1 further comprising overhead track means, said third gripper means being movable along said overhead track means.

* * * * *